June 3, 1930. H. M. WITHEROW 1,761,765
TEMPERATURE RESPONSIVE INDUCTANCE
Original Filed Dec. 13, 1927
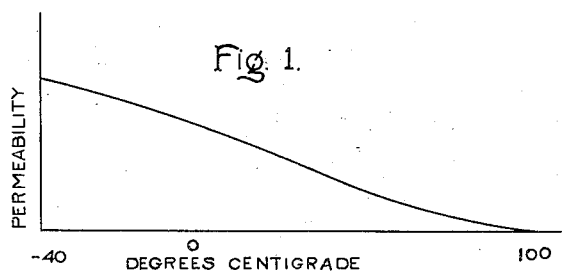
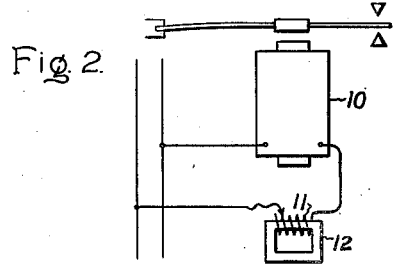
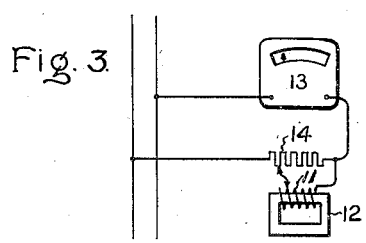
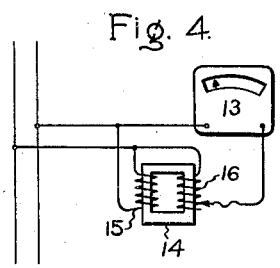
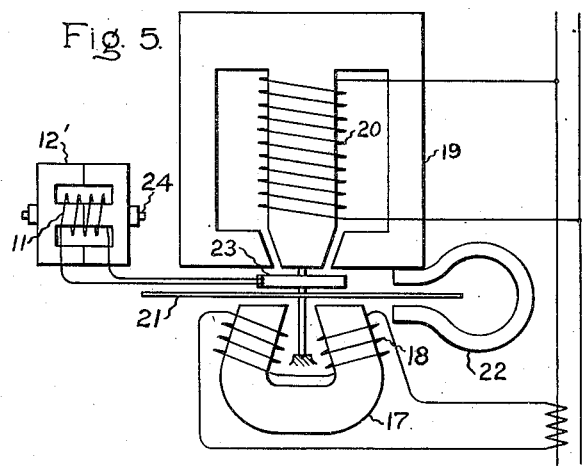
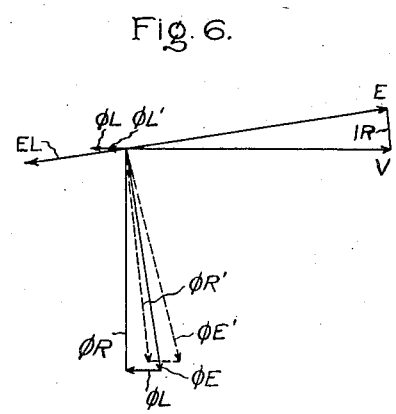
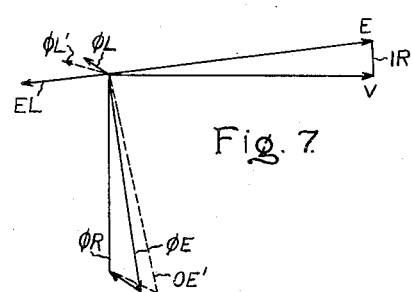
Inventor:
Harry M. Witherow,
by Charles E. Tullar
His Attorney.

Patented June 3, 1930

1,761,765

UNITED STATES PATENT OFFICE

HARRY M. WITHEROW, OF FORT WAYNE, INDIANA, ASSIGNOR TO GENERAL ELECTRIC COMPANY, A CORPORATION OF NEW YORK

TEMPERATURE-RESPONSIVE INDUCTANCE

Original application filed December 13, 1927, Serial No. 239,802. Divided and this application filed October 30, 1928. Serial No. 316,057.

This application is a division of my application Serial No. 239,802, filed December 13, 1927, and both applications are assigned to the same assignee.

My invention relates to temperature compensation of electrical devices and circuits such as meters, relays, measuring circuits and the like. I have found my invention to be useful in connection with a wattmeter for compensating such a meter for that class of temperature errors which are pronounced at low power factors. The invention however is not limited to this particular application as will be apparent from the description which follows: Broadly, the invention relates to a temperature responsive inductance device which may be connected in any electric circuit to vary the inductance of such circuit in response to temperature changes. To obtain this result I provide an inductance device having a core or magnetic circuit made from a material the permeability of which varies with temperature changes.

The features of my invention which are believed to be novel and patentable will be pointed out in the claims appended hereto. For a better understanding of my invention reference is made in the following description to the accompanying drawing in which Fig. 1 represents the temperature permeability characteristics of a material which I have found to be satisfactory for use as the core material of my inductance device; Fig. 2 represents my temperature responsive inductance connected in series with an alternating current circuit to increase the current therein in response to an increase in temperature; Fig. 3 shows how the opposite effect may be accomplished by employing the temperature responsive inductance as a shunt; Fig. 4 illustrates the use of my invention in a transformer in which the core is made of a material having a negative temperature coefficient of permeability; Fig. 5 represents the use of the invention for compensating a wattmeter for temperature errors in which my temperature responsive inductance is connected in series with the lag coil of the meter; and Figs. 6 and 7 are vector diagrams explanatory of the potential flux lagging of such a meter before and after compensation respectively.

Referring first to Fig. 1, I have shown a temperature permeability curve of a material having a substantially linear negative temperature coefficient of permeability over a wide range of temperature. The particular material from which this curve is taken is an alloy of copper and nickel, preferably containing a small percentage of iron, the percentages being about 68% nickel, 30% copper and 2% iron. Such an alloy when cast and then quenched in water as soon as it solidifies will give a negative temperature coefficient of permeability substantially of the character represented in Fig. 1. This alloy is not my invention but rather the invention of Isaac F. Kinnard, and is more fully described and claimed in his Patent No. 1,706,172, March 19, 1929. I do not confine my invention to the use of this particular material but mention it as one which I have found to give beneficial results in the application of my invention represented in Fig. 5.

A simple application of the invention is represented in Fig. 2. In this figure I have represented a voltage responsive relay for use on alternating current circuits. If the relay coil 10 is made of copper, or some other material having a positive temperature coefficient of resistance, its resistance will increase with an increase in temperature and ordinarily its current will decrease for the same operating voltage. The relay will thus have a temperature error. To compensate for such error I connect my temperature responsive inductance device in series with the relay coil. This device merely consists of a coil 11 wound on a closed core 12 made of a material having a negative temperature coefficient of permeability and placed so that it is subject to the same temperature as the relay coil 10. If this core 12 has the characteristics represented in Fig. 1, it will have an appreciable inductance at zero degrees centigrade for example and its inductance will gradually decrease as the temperature increases until at about 100 degrees centigrade its permeability will disappear and the inductance device will function as an air core device with less inductance than at the lower temperature. By varying the number of turns in the winding of this device we may compensate the relay circuit so that the increase in resistance in the circuit is just compensated for by a decrease in inductance and vice versa over the temperature range ordinarily met with in practice. The current in the relay circuit and likewise the operation of the relay will thus be independent of temperature changes. It is of course assumed that the frequency of the supply voltage remains substantially constant.

In Fig. 3, 13 represents an A. C. voltmeter which requires a resistance 14 in its circuit. If the meter and resistance have a combined positive temperature coefficient of resistance the meter circuit will be subject to a temperature error. To compensate for this I connect my inductance 11, 12 in shunt to a suitable value of resistance 14 so as to maintain the current through the meter 13 independent of temperature changes.

Fig. 4 represents the use of my inductance device as a temperature compensating transformer. In this case 13 may represent an A. C. voltmeter, as in Fig. 3, which has a positive temperature coefficient of resistance. 14 represents a transformer core made of a material the permeability of which decreases with an increase in temperature. 15 represents the primary coil connected across the voltage source measured by meter 13, and 16 represents the secondary coil connected in the voltmeter circuit. In this case the transformer connection is such that the transformer bucks the voltage in the voltmeter circuit. At low temperatures there will be an appreciable transformer action which will gradually decrease as the temperature increases. By using the proper number of turns on the primary and secondary windings the decrease in transformer action may be adjusted to just compensate for the increase in resistance in the meter circuit as the temperature increases. The primary winding of the transformer will preferably be of high resistance so that its current will not become excessive as the transformer action decreases.

In the applications above explained the temperature responsive inductance has been employed to simply vary the current in an alternating current circuit in response to temperature changes. It being a variable inductance it of course varies the phase angle of the current in the circuit and in Fig. 5 I have made use of this variable characteristic as well as the variable current characteristic in compensating a wattmeter for temperature errors which tend to cause a shift in the phase angle between the voltage and current fluxes.

It is well known that in the induction wattmeter the phase angle between the current and voltage fluxes should be in a 90 degree relation at unity power factor. The greater part of this 90 degree relation is produced by the voltage coil because of its high inductance and the remainder is usually produced by a lag coil which is placed in inductive relation with the potential flux. In Fig. 5, 17 represents the current core, 18 the current coil, 19 the voltage core, 20 the voltage coil, 21 the rotatably mounted induction disc, 22 the drag magnet and 23 the lag coil of an induction watthour meter. Ordinarily the lag coil comprises a closed coil of one or more turns placed near the tip of the potential coil and adjustment is made by varying its resistance or shifting its position.

Fig. 6 represents the vector relations explanatory of the usual arrangement and the error caused by temperature changes. In this diagram V may represent the vector of the voltage impressed upon the voltage coil 20 and E the induced voltage in the coil. These vectors are not in line because the voltage coil is not a perfect inductance, but has some resistance which produces a resistance drop which is represented by the vector IR. As a result the vector of the voltage coil flux represented by $\Phi E$ is somewhat less than 90 degrees from the line voltage vector V. To make the angle between V and $\Phi E$ 90 degrees a lag coil is employed and the voltage induced in it by transformer action may be represented by the vector EL. The lag coil is largely resistance and its flux vector may be represented by $\Phi L$. The resultant of $\Phi E$ and $\Phi L$ is represented by $\Phi R$ which establishes the desired 90 degree relation between the line voltage and the potential flux of the meter at some given temperature. The voltage and lag coils are usually made of copper which has a positive temperature coefficient of resistance. Consequently at some higher temperature the resistance drop in the voltage coil increases and the vector IR increases causing the vector $\Phi E$ to shift to $\Phi E'$. The resistance of the lag coil also increases and its current therefore decreases so that its flux vector becomes smaller but does not change in direction to any noticeable extent and may be represented by $\Phi L'$. The new resultant potential flux of the meter is represented at $\Phi R'$ which is appreciably less than 90 degrees from the line voltage vector V. This explains the cause of the phase angle temperature error of this type of meter. This temperature error does not materially affect the accuracy of the meter near unity power factors but at low power factors where a slight shift in the phase angle between current and voltage fluxes is more serious this type of temperature error produces an appreciable error in meter accuracy. The vector of the current flux has not been shown but it will be understood that its vector direction is dependent solely upon the power factor and is in phase with the vector V at unity power factor.

To compensate for this class of temperature errors in meters of the induction type I connect my temperature responsive inductance in series with the lag coil as represented in Fig. 5. For the purpose of convenience in assembling, the core 12′ of the temperature responsive inductance is split in two parts and fastened together by a brass bolt 24 after the coil 11 is slipped on the central leg. For a 60 cycle meter of standard design I have found that a lag coil 23 having six turns of copper connected in series with about 25 turns in the coil 11 will produce the temperature compensation depicted in Fig. 7 where the same designation is used as in Fig. 6. The vectors V, E, IR and ΦE remain unchanged. The vector ΦL due to the inductance in the circuit of the lag coil has an increased angle with the vector EL at some low temperature such as 0° centigrade. The resultant of ΦL and ΦE or ΦR is correctly displaced at 90 degrees from V. Now as the temperature increases the inductance in the circuit of the lag coil decreases. The current in the lag coil circuit increases and becomes more nearly in phase with its induced voltage as represented at ΦL′. The potential flux of the meter at the higher temperature is the resultant of ΦE′ and ΦL′ or ΦR and is the same both in direction and in magnitude as it was at the low temperature. Thus use is made of both the change in current and the change in phase angle produced by the temperature responsive inductance to compensate the meter for this class of temperature errors over the usual range of temperature changes met with in practice.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A temperature responsive reactance having a core member made of a material which is magnetic at zero degrees centigrade and which is substantially non-magnetic at 100 degrees centigrade and an energizing winding on said core member.

2. A temperature responsive reactance comprising a core member, a winding on said core member for producing a flux therein, said core member having an appreciable negative temperature coefficient of permeability.

3. A temperature responsive reactance comprising a core member, a winding for producing a flux in said core member, the core member being made of a material which is substantially non-magnetic at about 100 degrees centigrade and which has a substantially linear negative temperature coefficient of permeability below such temperature.

4. Temperature responsive reactance comprising a core member provided with an energizing winding, said core member comprising an alloy composed of approximately 68% nickel and 30% copper and 2% iron, and having a substantially linear negative temperature coefficient of permeability over a temperature range of at least 40 degrees centigrade and including zero degrees centigrade.

In witness whereof I have hereunto set my hand this 27th day of October, 1928.

HARRY M. WITHEROW.